United States Patent
Rainsberger et al.

[15] 3,702,394
[45] Nov. 7, 1972

[54] ELECTRONIC DOUBLE INTEGRATOR

[72] Inventors: Paul J. Rainsberger; Charles M. Dye, Jr., both of China Lake, Calif.

[73] Assignee: The United States of America as represented by the Secretary of the United States Navy

[22] Filed: Sept. 17, 1970

[21] Appl. No.: 72,906

[52] U.S. Cl. ............235/183, 235/151.32, 328/127, 340/173 CH
[51] Int. Cl. ...........................G06g 7/18, G06g 7/78
[58] Field of Search............235/183, 150.25, 151.32; 340/173 CH; 328/127; 324/113, 181

[56] References Cited

UNITED STATES PATENTS

| | | | |
|---|---|---|---|
| 3,296,422 | 1/1967 | Rusler | 235/150.25 |
| 3,484,593 | 12/1969 | Schmoock et al. | 235/183 |
| 3,340,387 | 9/1967 | Anderson | 235/183 X |
| 2,791,473 | 5/1957 | Mattox | 340/173 CH |
| 3,500,342 | 3/1970 | Bisset et al. | 340/173 CH |
| 2,613,071 | 10/1952 | Hansel | 235/151.32 X |
| 3,192,371 | 6/1965 | Brahm | 235/183 |
| 3,575,592 | 4/1971 | Carter | 235/183 |
| 3,287,640 | 11/1966 | Rehage | 235/183 X |
| 3,501,652 | 3/1970 | Thomson | 328/127 X |
| 3,531,633 | 9/1970 | Johnson | 235/183 |
| 3,617,861 | 11/1971 | Ford et al. | 328/127 |

FOREIGN PATENTS OR APPLICATIONS 1,097,100  12/1967  Great Britain.............328/127

*Primary Examiner*—Felix D. Gruber
*Attorney*—R. S. Sciascia and Roy Miller

[57] ABSTRACT

An electronic double integrator circuit including an accelerometer; first and second integrators, at least one of which has an operational amplifier with capacitive-resistive feedback; and a logic circuit. The system provides an output when the accumulated input derived from the accelerometer indicates that a spatial, rather than time, interval has occurred.

1 Claim, 2 Drawing Figures

PATENTED NOV 7 1972 3,702,394

INVENTORS.
PAUL J. RAINSBERGER
CHARLES M. DYE
BY ROY MILLER
ATTORNEY.

ELECTRONIC DOUBLE INTEGRATOR

GOVERNMENT INTEREST

The invention described herein may be manufactured and used by or for the Government of the United States of America for governmental purposes without the payment of any royalties thereon or therefor.

BACKGROUND OF THE INVENTION

In the prior art the devices used to obtain spatial intervals of a moving object were only partial or single integrators. These devices are limited because they can only sample a portion of the input signal and cannot provide the proper function if a partial failure results. Even under normal operation compromises are necessary due to the variations in acceleration and deceleration forces that can be expected. Where mechanical integrators are used there are basic mechanical problems such as vibration, temperature, shock, and humidity.

Integration by a resistive-capacitive network is based on the principle that the voltage across a capacitor is proportional to the input of the current through it. By using the capacitor in an amplifier feedback circuit, as in the present invention, the capacitance effect is multiplied by the gain of the amplifier, thereby effectively reducing the size of the required capacitor.

SUMMARY OF THE INVENTION

The present invention is a device for providing an output signal at a predetermined spatial interval based on the double integration of the input signal from an accelerometer. It is simpler, and more accurate and reliable than prior devices. At least one of the integrators is an operational amplifier with capacitive-resistive feedback. An SCR switch in the output circuit is triggered by the output of the second integrator after the predetermined spatial interval has occurred, providing the system output. The spatial interval is the distance in space that the system must traverse before the output will be provided.

Figure 1:
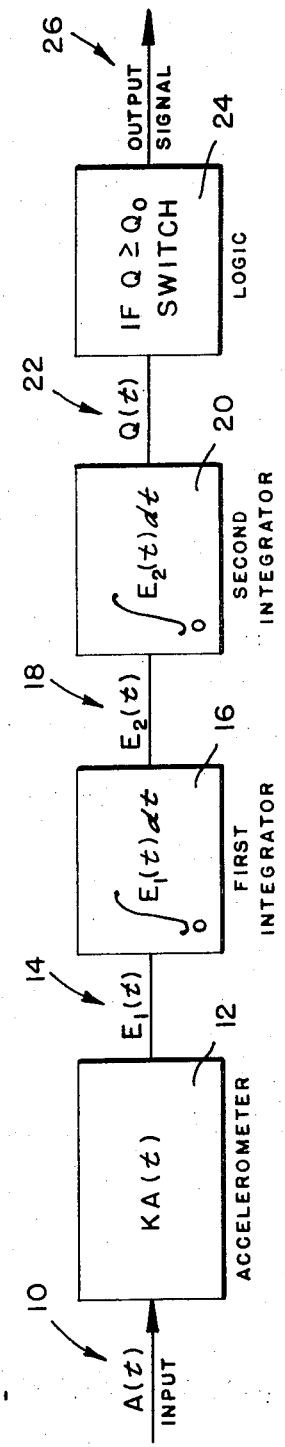
FIG. 1 is a block diagram of the present invention.

DESCRIPTION OF THE PREFERRED EMBODIMENT:

Referring to FIG. 1, the present invention has an accelerometer 12, first and second integrators 16 and 20, and a logic circuit 24. The system input 10 is coupled to accelerometer 12 which provides output 14. Accelerometer 12 may be a voltage divider circuit responsive to acceleration and deceleration. Output 14 is coupled to first integrator 16 which output 18 is coupled to second integrator 20. The output 22 of second integrator 20 is in turn coupled to logic circuit 24 which provides the system output 26.

Figure 2:
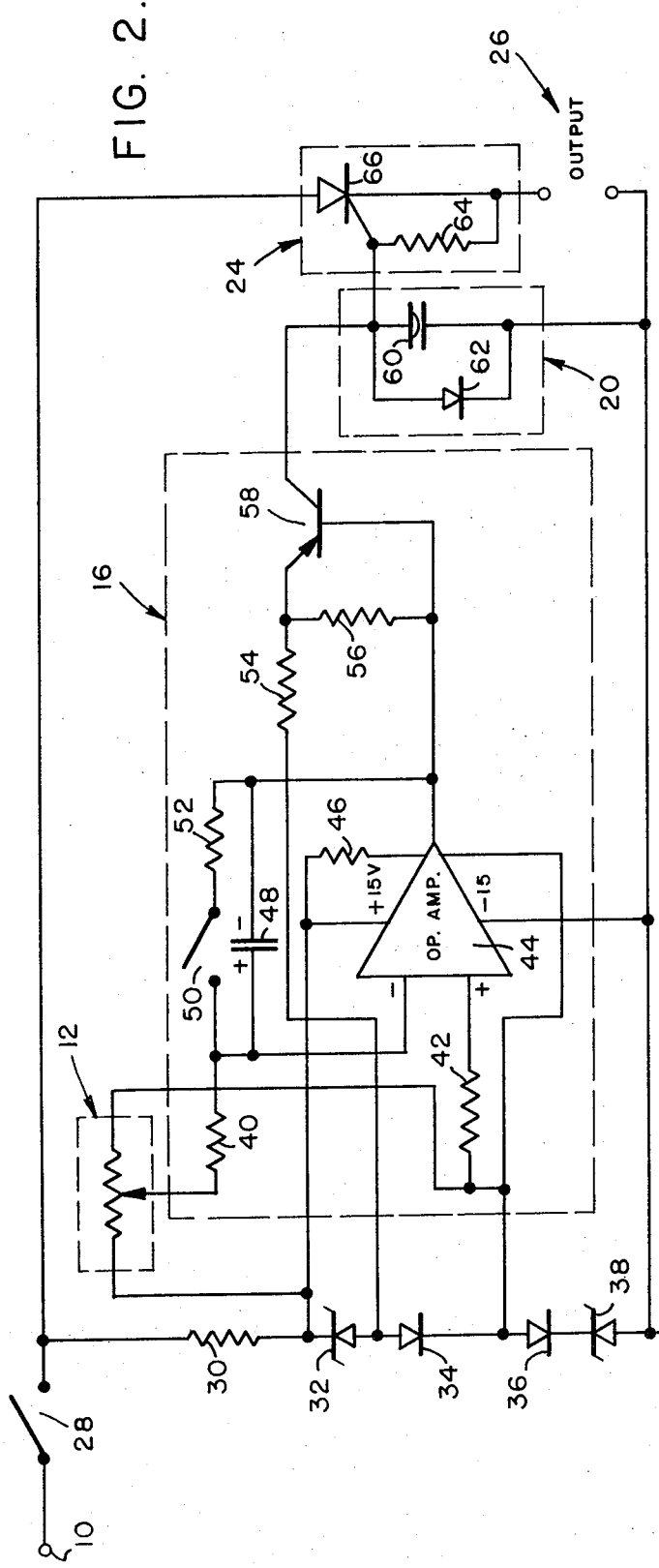
FIG. 2 is a schematic diagram of the preferred embodiment.

Referring to FIG. 2 wherein the blocks of FIG. 1 are indicated with like numbers in the preferred circuit form. Resistor 30 and diodes 30, 32, 34, 36, and 38 make up a regulated power supply, and are connected in a manner which provides the required positive and negative supply to the operational amplifier 44 of first integrators 16. Although the positive and negative voltages could be supplied by batteries or separate power supplies some voltage regulation is desirable.

The operation of the invention is as follows: Closing on-off switch 28 couples the input power supply 10 to resistor 30 and diodes 32, 34, 36, and 38 which provide a regulated voltage to accelerometer 12 and operational amplifier 44 of first integrator 16. The output of accelerometer 12 is connected through precision resistors 40 and 42 to the input of operational amplifier 44. Assuming switch 50 is open, capacitor 48 in the feedback network of operational amplifier 44 will charge, causing operational amplifier 44 to integrate the output of accelerometer 12. Resistor 52 is chosen such that when switch 50 is closed the resistor will provide a low impedance bypass across capacitor 48 and will prevent it from charging.

When switch 50 is open the voltage output from operational amplifier 44 will be proportional to the integral of the voltage output of accelerometer 12 which is dependent upon either acceleration or deceleration. The output of operational amplifier 44 is coupled to the base of transistor 58. Therefore, the current through resistor 54 and transistor 58 is proportional to the output of operational amplifier 44, and is the current input to second integrator 20.

In this embodiment second integrator 20 is an E-cell 60 manufactured by Bisett-Berman of Santa Monica, Calif. When a predetermined quantity of material is transferred from the electrode of the E-cell its impedance changes from a low value to a high value, which causes the voltage across the cell to increase. The gate of SCR 66 is coupled to E-cell 60. When the voltage across E-cell 60 increases to a predetermined value SCR 66 turns "on" to provide output 26. Output 26 can be coupled to a variety of loads depending upon the application desired.

Resistor 56 is connected between the base and emitter of transistor 58 to prevent leakage current through the transistor when the output of operational amplifier 44 is at zero volts. Diode 62 it utilized to protect E-cell 60 during tests. And resistor 64 is utilized to provide bias for the gate of SCR 66.

The following list is provided by way of example only as to the type and value of circuit components in the preferred embodiment:

| Symbol | Component | Type or Value |
| --- | --- | --- |
| 28 | Switch | |
| 30 | Resistor | 270 ohm |
| 32 | Zener Diode | 1N3010B |
| 34 | Diode | 1N458A |
| 36 | Diode | 1N458A |
| 38 | Zener Diode | 1N3019B |
| 40 | Resistor | 107 Kilohm, ±1% |
| 42 | Resistor | 197 Kilohm, ±1% |
| 44 | Operational Amplifier | |
| 46 | Resistor | 27 Kilohm |
| 48 | Capacitor | 4.7 microfarad, 35 volt |
| 50 | Switch | |
| 52 | Resistor | 100 ohm |
| 54 | Resistor | 1 Kilohm ±1% |
| 56 | Resistor | 2 Kilohm |
| 58 | Transistor | 2N3762 |
| 60 | E-cell | |
| 62 | Diode | 1N458A |
| 64 | Resistor | 1 Kilohm |
| 66 | Silicon Controlled Rectifier | 2N2322 |

Manufactured by Bisett-Berman, Santa Monica, Calif.

The invention can be constructed of any combination of integrated circuits and/or discrete components convenient to the user. The E-cell may be replaced with a resistive-capacitive network or second operational amplifier to perform the second integration.

What is claimed is:

1. An electronic double integrator system for providing an output signal a predetermined spatial interval after initiation comprising:

means for providing an electrical signal in response to spatial acceleration experienced by said system;

first integrating means coupled to said signal providing means for integrating said signal and providing an output in response to said integrated signal, including an operational amplifier, having capacitive feedback, coupled to said signal providing means and a transistor having its first terminal coupled to the output of said operational amplifier wherein said first terminal is its base terminal, its second terminal coupled to a current source, and its third terminal coupled to a second integrating means, wherein said third terminal provides said output of said first integrating means, such that the output of said transistor is proportional to the output of said operational amplifier;

second integrating means coupled to said first integrating means for integrating said transistor output and providing said integrated transistor output as an output, including an E-cell having a first terminal coupled to said third terminal of the transistor and a second terminal coupled to the system common ground; and means coupled to said second integrating means and gated by a predetermined value of said integrating means output for providing said system output, including a silicon controlled rectifier having its gate terminal coupled to said first terminal of said E-cell, its anode terminal coupled to a source of electrical energy, and its cathode terminal coupled to the system output terminals;

wherein said predetermined value is representative of said predetermined spatial interval.

* * * * *